Patented June 5, 1928.

1,672,029

UNITED STATES PATENT OFFICE.

MYRON HEYN, OF BERLIN, GERMANY, ASSIGNOR TO C. A. F. KAHLBAUM CHEMISCHE FABRIK G. M. B. H., OF BERLIN-ADLERSHOF, GERMANY, A CORPORATION OF GERMANY.

PROCESS FOR THE PRODUCTION OF AMIDOGUANIDINES AND THEIR ALKYL DERIVATIVES.

No Drawing. Application filed July 27, 1926, Serial No. 125,322, and in Germany August 5, 1924.

My invention refers to new chemical products and more especially to guanidine derivatives and to the method of producing same. It has particular reference to amino alkyl guanidines which have been shown to be of value for therapeutical uses.

A number of methods are known for producing derivatives of guanidine, the one mostly used being the reaction between cyanamide and an amino salt discovered by Erlenmeyer (Berichte 14, 1868/1881). This method has also been used for guanylizing diamines by Kiesel (Zeitschrift für physiologische Chemie, 118, 277/1922), who prepared amino butylene guanidine. However, this method involves the formation of byproducts, partly owing to a polymerization of the cyanamide, partly to the introduction of 2 mols cyanamide, whereby the corresponding diguanidine is formed.

I have now found that pure products can be obtained more readily if the reaction between S-alkyl isothiourea and amine, discovered by Rathke (Berichte 17, 309, 1884) is used for the synthetical production of aminoalkyl guanidines, amino guanidines and alkyl amino guanidines. Hitherto this method has only been employed for producing low alkyl guanidines.

The reaction occurs at ordinary or slightly raised temperature and the desired guanidine derivative is obtained with excellent yield.

The monosalts of the resulting products show an alkaline, the bisalts a neutral reaction. On being treated with concentrated alkali they split off ammonia, while with aldehydes the Schiff bases are formed.

Example 1.

A concentrated watery solution of 40 parts by weight tetramethylene diamine was gradually mixed on the water bath with a concentrated solution of 50 parts S-methyl isothiourea sulfate and slightly heated and the residue remaining over after distillation is well mixed in vacuo and is purified in a suitable manner. There result about 80 per cent amino butylene guanidine sulfate. The reaction takes place according to the formula

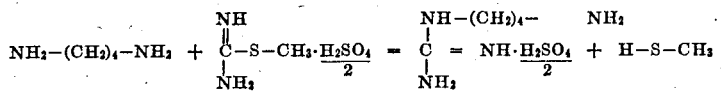

Example 2.

A concentrated watery solution of 60 parts by weight S-methyl isothiourea sulfate is added to a concentrated solution of 50 parts pentamethylene diamine. The mixture is slightly heated on the water bath and the residue left after distillation is purified in a suitable manner. There are obtained about 80 per cent amino pentylene guanidine sulfate. The S-methyl isothiourea sulfate used in this reaction can easily be produced according to the method described by Fritz Arndt (Berichte 1921, page 2236). The reaction occurs according to the formula

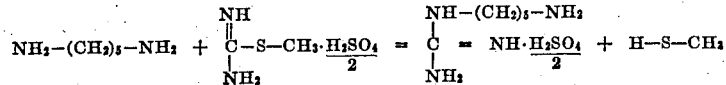

In watery solution the product shows a slight alkaline reaction with litmus and is decomposed by concentrated caustic alkali.

Example 3.

A concentrated solution of 5 parts by weight hydrazine hydrate in water is mixed with a concentrated solution of 12 parts S-methyl isothiourea sulfate. The mixture being first allowed to stand some time at ordinary temperature is then subjected to distillation, the residue being purified in a well known manner. About 70–80 per cent amino guanidine sulfate are obtained. The reaction takes place according to the formula

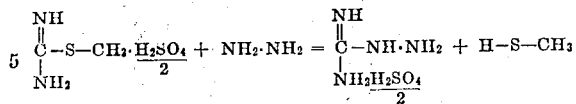

Both the base and the salts thereof are readily soluble in water. The base reacts with aldehydes. The hydrobromide melts at 155–156° C.

*Example 4.*

A concentrated solution of 5 parts by weight methylhydrazine is mixed with a concentrated solution of 15 parts S-methyl isothiourea sulfate. The mixture and the resulting residue are further treated as described with reference to Example 3. There are obtained 70–80 per cent methylamino guanidine sulfate. The reaction occurs according to the formula

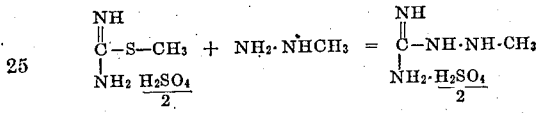

The salts of this product are crystalline, the picrate dissolves in water only with difficulty. In the presence of sodium bicarbonate the base discolors an iodine-potassium iodide solution.

*Example 5.*

A concentrated solution of 3 parts by weight tetramethylene diamine is gradually mixed with a concentrated solution of 8 parts S-ethyl isothiourea sulfate. The further treatment is in accordance with the one described with reference to Example 3. There are obtained about 60 per cent aminobutylene guanidine sulfate.

Various changes may be made in the details disclosed in the foregoing specification without departing from the invention or sacrificing the advantages thereof.

I claim:—

1. The process of producing a combination of guanidine with a compound containing at least one amino group comprising acting on such compound with a quantity of S-alkyl thiourea which does not substantially exceed the quantity required for introducing guanidine in a single amino group.

2. The process of producing a combination of guanidine with a compound containing two amino groups comprising acting on such compound with a quantity of S-alkyl thiourea which does not substantially exceed the quantity required for introducing guanidine in a single amino group.

3. As new products, aminoalkylene guanidines having the formula

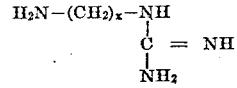

wherein $x$ is a figure above 4, the monosalts of these products showing an alkaline, the bisalts neutral reaction. The products on being treated with concentrated alkali split off ammonia, while with aldehydes the Schiff bases are formed.

4. As a new product, aminopentylene guanidine, having the formula

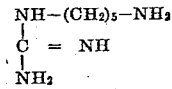

the water-soluble salts of which show an alkaline, the bisalts neutral reaction, the salts being decomposed by heating, the picrate dissolving in water only with difficulty.

In testimony whereof I have signed my name to this specification.

MYRON HEYN.